(12) United States Patent
Buyuksahin

(10) Patent No.: US 10,677,673 B2
(45) Date of Patent: Jun. 9, 2020

(54) PRACTICAL SENSING SYSTEM

(71) Applicant: SENSOBRIGHT INDUSTRIES, LLC, Dover City, Kent County, DE (US)

(72) Inventor: Utku Buyuksahin, Kadikoy/Istanbul (TR)

(73) Assignee: SENSOBRIGHT INDUSTRIES, LLC, Dover City, DE (US)

( * ) Notice: Subject to any disclaimer, the term of this patent is extended or adjusted under 35 U.S.C. 154(b) by 0 days.

(21) Appl. No.: 16/099,837

(22) PCT Filed: Apr. 27, 2017

(86) PCT No.: PCT/TR2017/050169
§ 371 (c)(1),
(2) Date: Nov. 8, 2018

(87) PCT Pub. No.: WO2017/196282
PCT Pub. Date: Nov. 16, 2017

(65) Prior Publication Data
US 2019/0113408 A1  Apr. 18, 2019

(30) Foreign Application Priority Data

May 13, 2016  (TR) .................. 2016 06374

(51) Int. Cl.
*G01L 5/166* (2020.01)
*G01L 5/22* (2006.01)
(Continued)

(52) U.S. Cl.
CPC .............. *G01L 5/166* (2013.01); *G01L 5/226* (2013.01); *G06F 3/0421* (2013.01);
(Continued)

(58) Field of Classification Search
CPC ....... G01L 5/166; G01L 5/226; G06F 3/0421; G06K 9/0064; G06K 9/00664; G06T 7/50; G06T 7/20
(Continued)

(56) References Cited

U.S. PATENT DOCUMENTS 7,420,155 B2 * 9/2008 Mizota .................. B25J 13/084
  250/221
8,411,140 B2 * 4/2013 Adelson ............... A61B 5/1172
  348/135

(Continued)

FOREIGN PATENT DOCUMENTS

WO  2005/029028 A1  3/2005
WO  2014/011126 A1  1/2014

OTHER PUBLICATIONS

International Search Report for corresponding PCT application No. PCT/TR2017/050169, dated Nov. 29, 2017.
(Continued)

*Primary Examiner* — Octavia Hollington
(74) *Attorney, Agent, or Firm* — Notaro, Michalos & Zaccaria P.C.

(57) ABSTRACT

A sensing system where the position and intensity of a force applied is detected in an easy and practical manner and an image and video of the surrounding environment is taken, and a three-dimensional scanning thereof is performed. The surface texture of the object touched and creep is detected; and a two-dimensional and three-dimensional image (hologram) may be generated and physical and/or chemical features are detected.

14 Claims, 2 Drawing Sheets

(51) Int. Cl.
*G06F 3/042* (2006.01)
*G06K 9/00* (2006.01)
*G06T 7/50* (2017.01)
*G06T 7/20* (2017.01)

(52) U.S. Cl.
CPC ............ *G06K 9/00664* (2013.01); *G06T 7/20* (2013.01); *G06T 7/50* (2017.01)

(58) Field of Classification Search
USPC .................................................... 73/862.046
See application file for complete search history.

(56) References Cited

U.S. PATENT DOCUMENTS

| | | | |
|---|---|---|---|
| 8,629,987 B2* | 1/2014 | Nakanishi | G01D 5/34715 |
| | | | 250/221 |
| 9,030,653 B1* | 5/2015 | Buyuksahin | G01L 5/228 |
| | | | 356/32 |
| 9,207,807 B2* | 12/2015 | Tsai | G06F 3/042 |
| 2007/0227267 A1 | 10/2007 | Loeb et al. | |
| 2008/0027582 A1 | 1/2008 | Obinata et al. | |
| 2009/0315989 A1 | 12/2009 | Adelson | |
| 2010/0155579 A1 | 6/2010 | Torres-Jara | |
| 2014/0326882 A1* | 11/2014 | Tar | G01L 5/166 |
| | | | 250/338.1 |
| 2015/0339845 A1* | 11/2015 | Privsek | G09F 9/33 |
| | | | 345/419 |
| 2019/0155453 A1* | 5/2019 | Buyuksahin | G06F 3/0425 |

OTHER PUBLICATIONS

Written Opinion of the International Preliminary Examining Authority for corresponding PCT application No. PCT/TR2017/050169, dated Apr. 20, 2018.

International Preliminary Report on Patentability for corresponding PCT application No. PCT/TR2017/050169, dated Aug. 31, 2018.

* cited by examiner

PRACTICAL SENSING SYSTEM

RELEVANT TECHNICAL FIELD

The present invention relates to sensing systems that are used especially in robotic systems.

BACKGROUND ART

In order to explore those areas which may be dangerous for human (for example, different planets, underground tunnels or caves), exploration robots are used. Exploration robots comprise various sensors for detecting objects in the area they are sent and for identifying the characteristics of the said objects. One of the sensors used in the said exploration robots is tactile sensors. By means of the tactile sensors, presence of certain objects, the force applied by them and some physical features thereof such as pressure and rigidity can be detected.

The conventional tactile sensors comprise a light source positioned under an elastic surface and a light sensing element for sensing the amount of the light reflected from the said surface, as disclosed in US2010155579A1. In such tactile sensors, when a force is applied on the elastic surface, the said surface approaches to the light source and the light sensing element. As a result of such approach, the amount of light incident on the light sensing element increases. The amount of light sensed by the light sensing element and resilience properties of the surface are used to calculate the amount of force applied to the surface. However, in this embodiment, the number of light sources that may be positioned under the unit surface and of the light sensing elements are limited, and it is cumbersome to process data received from a high number of light sensing elements.

Said problems are solved by a module disclosed in WO2014011126A1. The said module comprises an elastic material, which is covered with a layer providing light reflection; a CMOS or CCD image sensor; at least one light source; a plurality of first fiber optic cables, a tips of which are separated from surrounding environment via said layer by being located under the layer and other tips of which are in connection with said light source, wherein said first fiber optic cables carry light beams from the light source to said layer; a plurality of second fiber optic cables, a tips of which are separated from surrounding environment via said layer by being located under the layer and being directed towards the layer and other tips of which are in connection with said image sensor so that each second fiber optic cable is paired with one pixel of the image sensor, wherein light beams reflected from the layer are transferred to the image sensor by said second fiber optic cables; a processor which calculates every individual force applied to the layer according to light intensity changes of each pixel connected with a second fiber cable, of a photo frame generated by the image sensor in response to the displacement of the layer by using image processing techniques. In the module disclosed in WO2014011126A1, when the elastic material contacts to an object, a deformation is generated in the elastic material and the said layer (e.g. displacement of the layer towards the fiber optic cables). As a result of such displacement, the amount of light reflected from the layer to the fiber optic cable is changed. Said change in the amount of light is detected as a color change in the photo frame generated in the image sensor. The processor applies image processing techniques to the said photo frame so as to measure color changes of the photo, and thus the amount of displacement of the layer. Based on the amount of displacement calculated, the force applied on the elastic material is also calculated. By means of the displacement area represented by the area of color change in the image, the pressure applied is calculated. Although the tactile sensation is detected with a high resolution by means of the module disclosed in WO2014011126A1, since the said module can only sense touch, it cannot provide other sensing functions required by an exploration robot.

BRIEF DESCRIPTION OF THE INVENTION

With the present invention, there is provided a sensing system suitable for use especially in robotic systems. Said sensing system comprises at least an elastic layer; at least one image source positioned under the said elastic layer and generating at least one image and reflecting the image generated onto the elastic layer; at least one image sensor (i.e. a CCD, CMOS sensor etc.) positioned under the elastic layer, and capturing an image coming from the elastic layer or surrounding environment; at least one control unit which controls the image generated by the said image source and analyzes the image captured by the image sensor using image processing techniques so as to detect at least one data about the surrounding environment; at least a first data link for data communication between the image source and the control unit; and at least a second data link for data communication between the image sensor and the control unit.

In the sensing system according to the present invention, an image originating from the image source is transferred to the elastic layer so that an image of the elastic layer and/or the surrounding environment is captured by the image sensor and is processed in the control unit, whereby an object that contacts to the elastic layer may be detected. Thus, tactile sensation is provided by detecting a force applied on the elastic layer in an easy and practical manner, and also the surrounding environment can be scanned.

OBJECT OF THE INVENTION

An object of the present invention is to provide a sensing system suitable for use in robotic systems.

Another object of the present invention is to provide a sensing system capable of sensing touch.

Another object of the present invention is to provide a sensing system capable of performing two-dimensional scanning (capturing a photo and video of an image) and three-dimensional scanning.

Another object of the present invention is to provide a sensing system capable of sensing the surface texture of an object that is touched and the creep.

Another object of the present invention is to provide a sensing system capable of generating a two-dimensional and three-dimensional (hologram) image.

Yet another object of the present invention is to provide a sensing system which is easy-to-manufacture.

Still another object of the present invention is to provide a sensing system capable of sensing physical and/or chemical features.

DESCRIPTION OF THE DRAWINGS

Illustrative embodiments of the sensing system according to the present invention are illustrated in the enclosed drawings, in which.

Figure 1:
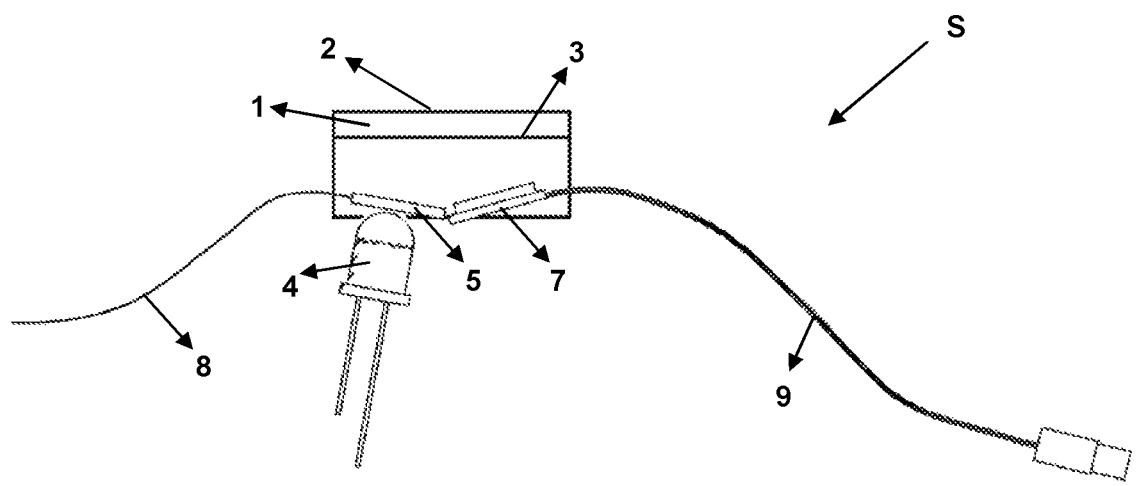
FIG. 1 is a side view of a sensing system.

All the parts illustrated in the drawings are individually assigned a reference numeral and the corresponding terms of these numbers are listed as follows:

Sensing system (S)
Image (P)
Elastic layer (1)
Upper surface (2)
Lower surface (3)
Light source (4)
Image source (5)
Robotic hand (6)
Image sensor (7)
First data link (8)
Second data link (9)
Floor (10)
Object (11)

DESCRIPTION OF THE INVENTION

With the advanced robot technology, senses such as seeing, hearing, touching can be detected by sensor systems. Particularly, in exploration robots used to explore those areas that are dangerous for humans or not possible for humankind to arrive, the characteristics of the areas that are being explored can be detected accurately by means of the said sensor systems. Therefore, with the present invention, a sensing system is provided which is capable of fulfilling different sensing functions.

The sensing system (S) according to the present invention, as illustrated in FIGS. 1-4, comprises at least an elastic layer (1); at least one image source (5) positioned under the said elastic layer (1) and generating at least one image (P) and reflecting the image generated onto the elastic layer (1); at least one image sensor (7) (i.e. a CCD, CMOS sensor etc.) positioned under the elastic layer (1), and capturing an image coming from the elastic layer (1) or surrounding environment; at least one control unit (not shown in the figures) which controls the image (P) generated by the said image source (5) and analyzes the image captured by the image sensor (7) using image processing techniques so as to detect at least one data about the surrounding environment. The sensing system (S) also comprises at least a first data link (8) for data communication between the image source (5) and the control unit; and at least a second data link (9) for data communication between the image sensor (7) and the control unit. The first data link (8) and the second data link (9) may be a wired connection or a wireless connection. Said elastic layer (1) comprises at least one upper surface (2) facing to the surrounding environment and at least one lower surface (3) facing to the image source (5) and the image sensor (7).

In an illustrative embodiment of the invention, the said upper surface (2) is light-proof (opaque or bright) and preferably not absorbing light. In this embodiment, the image (P) having a certain pattern is reflected to the elastic layer (1) by means of the said image source (5) in order to generate a pattern (for example, a squared chess board pattern) on the upper surface (2). An image frame of the pattern formed on the upper surface (2) is generated by the image sensor (7). Here, when a force is applied on the said elastic layer (1) (for example, when an object is placed on the elastic layer (1)), the elastic layer (1) on the respective region yields such that the upper surface (2) approaches to the lower surface (3). As a result of such displacement of the elastic layer (1), the pattern generated on the upper surface (2) is deformed. Thus, an image frame containing the deformed pattern is achieved in the image sensor (7). The way in which the pattern of the obtained image frame is deformed is analyzed by the control unit using image processing techniques in order to determine which part of the upper surface (2) approaches to the lower surface (3) and to what extent. The force and pressure applied to the elastic layer (1) is calculated based on the extent of the approach determined, the area of the yielding region and the modulus of elasticity of the elastic layer (1).

In another illustrative embodiment of the invention, the said upper layer (2) is transparent (light transmitting). In this embodiment, the image (P) having a certain pattern is transferred through the elastic layer (1) to the surrounding environment by means of the image source (5). When the image (P) transferred to the surrounding environment is incident on a floor (10) and/or an object (11), an image of the floor (10) and/or the object (11) is captured by the image sensor (7) so as to obtain an image frame. Here, the image obtained by the image source (5) may have a fixed pattern (for example, a chess board pattern), or a varying pattern may also be used. For instance, by changing the places of the black and white squares of a chess board pattern, different image frames may be obtained in the image sensor (7) from different patterns. By analyzing the obtained image frame or image frames in the control unit using image processing techniques, the visual data of the floor (10) and/or object (11) (such as the surface pattern of the object (11), overall shape etc.) may be obtained. Furthermore, a creep movement on the elastic layer (1) may be detected.

In the embodiments wherein the upper surface (2) is transparent, when an object is placed on the elastic layer (1) so as to apply force thereon, the image transmitted on the said object is captured by the image sensor (7) and the image frame captured is analyzed in the control unit using image processing techniques so that it may be determined how much the object is close to the lower surface (3). Since the distance of the object from the lower surface (3) also gives the distance of the upper surface (2) from the lower surface (3), it is determined which part of the upper surface (2) approaches to the lower surface (3) and to what extent. The force and pressure applied to the elastic layer (1) is calculated based on the extent of the approach of the upper surface (2) to the lower surface (3), the area of the yielding region and the modulus of elasticity of the elastic layer (1).

In an alternative embodiment wherein the upper layer (2) is transparent, the brightness of the image (P) generated in the image source (5) is set at a level (a limit level) that the elastic layer (1) is illuminated but no image (P) or light is transmitted to the surrounding environment. In this embodiment, when an object contacts on the elastic layer (1), those regions of the said object contacting to the elastic layer (1) are also illuminated. Thus, the image of the said object may be captured by the image sensor (7), even without a force applied by the said object on the elastic layer (1). In this embodiment, a creep movement on the elastic layer (1) may be detected. By increasing the intensity of the light from the limit level to a certain extent, the object may be sensed before it approaches to the system, and by reducing the intensity of the light from the limit level to a certain extent, it will be sensed after a little penetration has occurred, and thus it will be sensed with a certain threshold value.

Figure 2:
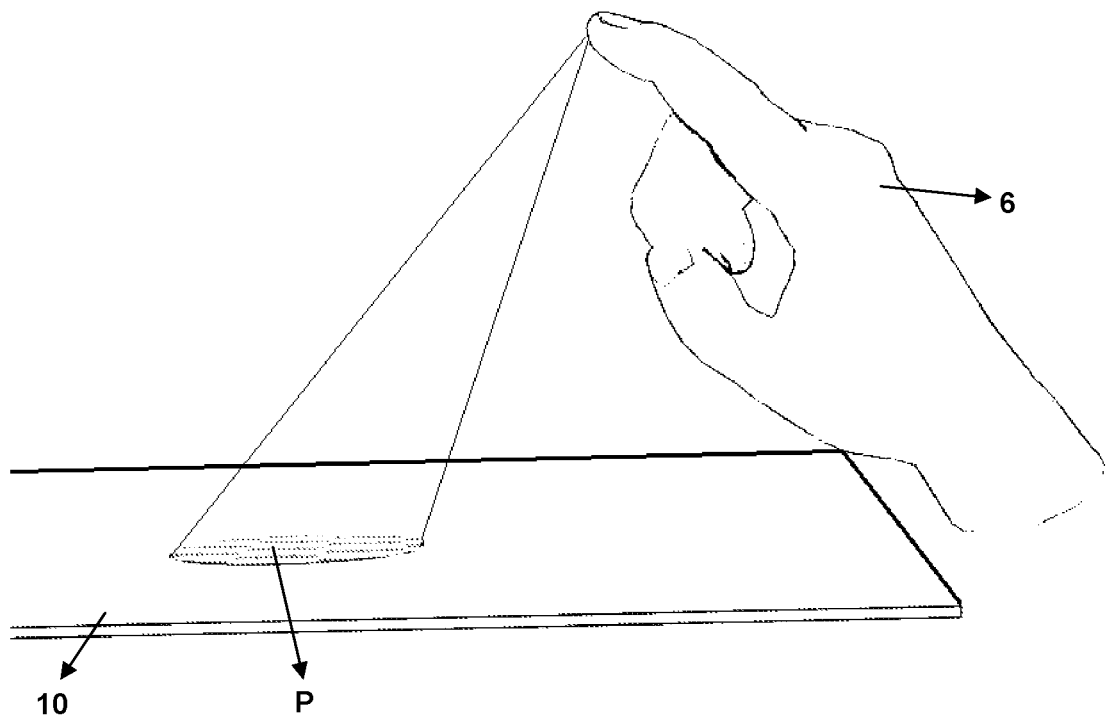
FIG. 2 is a perspective view of an exemplary embodiment of the sensing system.
Figure 3:
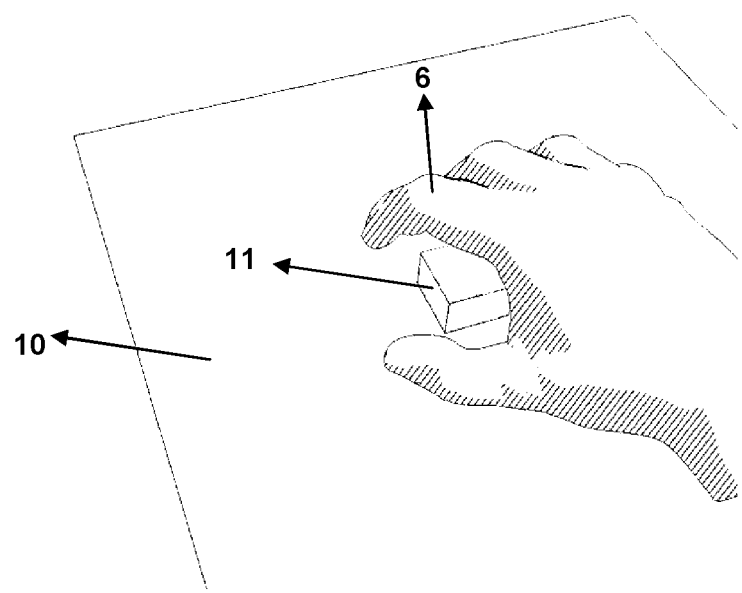
FIG. 3 is a perspective view of another exemplary embodiment of the sensing system.
Figure 4:
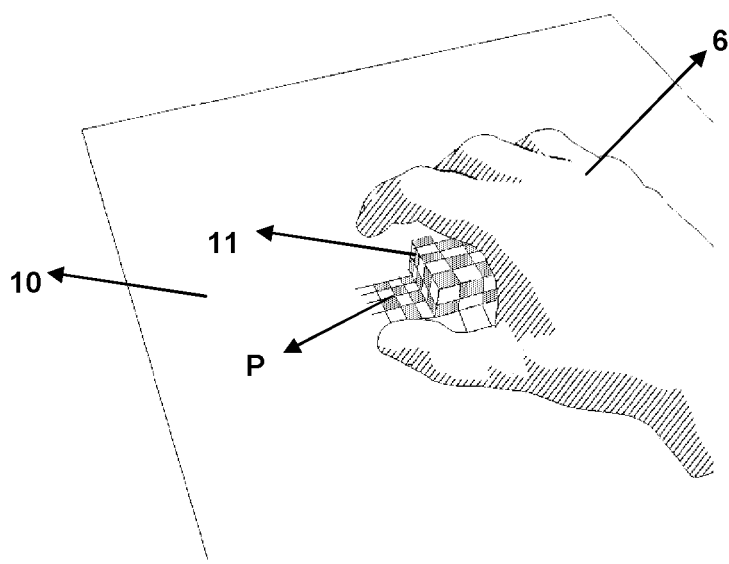
FIG. 4 is a perspective view of a further exemplary embodiment of the sensing system.

In another illustrative embodiment of the invention shown in FIGS. 2-4, the sensing system (S) according to the present invention is used in a robotic hand (6). A sensing system (S)

may either be disposed at an end of a finger of the robotic hand (6), or a separate sensing system (S) may be disposed at an end of each finger. In this embodiment, in the robotic hand (6), the elastic layer (1) mimics (simulates) the human flesh. In an embodiment wherein the upper surface (2) of the elastic layer (1) is transparent, an image (P) with a desired pattern may be transferred from the desired positions (those positions including a sensing system (S)) of the robotic hand (6) to the surrounding environment. Thus, a floor (10) is scanned in order to obtain a two-dimensional image thereof, as shown in FIG. 2, or an object (11) is scanned in order to obtain a three-dimensional image thereof as well as point cloud data and measures thereof with high precision which are suitable for being generated and/or copied by three-dimensional production tools such as a 3D printer, as shown in FIGS. 3-4. In an alternative embodiment, an image of the surrounding environment can be directly recorded without transferring a pattern or image (P) to the surrounding environment. In other words, the robotic hand (6) may be used as a camera. Furthermore, in this embodiment, the robotic hand (6) may preferably be used as a two-dimensional projector by transferring an image (P) on a flat floor (10). Alternatively, the robotic hand (6) may be used as a three-dimensional projector by transferring images (P) from different positions of the robotic hand (6) to a medium containing particles (for example, a medium containing water vapor). In this embodiment, the robotic hand (6) may comprise at least a source capable of generating vapor or another dense medium, in order to generate a medium such as water vapor.

In alternative embodiments of the invention, the sensing system (S) may be placed in a glove with similar features, instead of the robotic hand (6). Thus, if the glove is worn by a user, any applications performed by the robotic hand (6) may also be performed by the glove.

In a preferred embodiment of the invention, the said image source (5) is an LCD panel. In this embodiment, the sensing system (S) also comprises at least one light source (4) located at the side of the image source (5) not facing to the elastic element (1). The color and brightness values of each pixel in the LCD panel may be controlled independent from each other. Thus, color and brightness of the light transmitted to the elastic layer (1) may be controlled individually. In an alternative embodiment, the image source (5) is in the form of a panel, each pixel of which including a RGB LED. In this embodiment, color and brightness values of each pixel may be controlled independent from each other.

The light emitted by the light source (4) may have varying wavelengths (visible light, infrared light etc.), or may be at different blink frequencies (for example, constant blinking, fixed-frequency blinking, blinking at a frequency varied in a predetermined order). Thus, the light transmitted by the system for sensing may be distinguished from the images that may come from the surrounding environment and other lights, and it may be prevented that those lights other than the ones transmitted by the system cause an erroneous detection. In the said embodiments, the image sensor (7) is selected such that it senses the wavelength (i.e. infrared) of the light source (4) used and the frequency thereof (for example, a high frequency camera sensor).

In another preferred embodiment of the invention, the image sensor (7) of the sensing system (S) comprises special sensors for detecting certain physical and/or chemical features. For example, since the said image sensor (7) comprises a thermal camera sensor, the temperature of an object or of the surrounding environment may be detected.

In an alternative embodiment of the invention, the sensing system (S) comprises at least a fiber optic cable or cable bundle (not shown in the figures), a tips of which is paired with at least one pixel of the image sensor (7) and other tips of which comprises at least one fiber optic cable extending from the said elastic layer (1) to surrounding environment, which cable or cable bundle transmitting the image received from the surrounding environment to the image sensor (7). In this embodiment, the images obtained from the surrounding environment by means of the said fiber optic bundle may be directly transmitted to the image sensor (7). Thus, in embodiments wherein the elastic layer (1) is not transparent, the image of the surrounding environment may be obtained. Furthermore, this would be beneficial in industrial cutting and burning as well as incision and sealing by burning with surgery robots, by selecting the said fiber optic cable or cable bundle in a proper manner and transferring to the surrounding environment a suitable laser light for cutting and/or burning that is generated by means of a high-powered alternative light source.

In another alternative embodiment of the invention, the said fiber optic bundle is a multi-piece bundle. In this embodiment, the fiber optic bundle comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section. In this way, in the embodiments wherein the length of the fiber optic cables must be long, it will be sufficient that one or a limited number of fiber optic cables (carrier fiber) is long, instead of a high number of fiber optic cables. In another embodiment of the carrier fiber, the diameter of the said carrier fiber optic cable is lower than that of the first section and the second section. In this embodiment, in order to have an exact pairing of each fiber optic cable in the first section with each fiber optic cable in the second section (i.e. to ensure that the light beams coming from different fiber optic cables do not intervene with each other), the fiber optic bundle also comprises at least two optic elements, each interposed between the carrier fiber optic cable and the first section, and between the carrier fiber optic cable and the second section. The said optic elements prevent the light beams flowing through the carrier fiber optic cable from intervening with each other.

In another preferred embodiment of the invention, the sensing system (S) comprises at least one sound sensor (for example, a microphone). The said sound sensor is preferably located on the lower surface (3) of the elastic layer (1). Thus, creep-induced sound waves are also detected by the sound sensor and a precise detection is performed. In alternative embodiments, a plurality of sound sensors is used and the sound waves detected by the sensors are compared so that coordinates of a touch may be detected precisely.

In the sensing system (S) according to the present invention, an image originating from the image source (5) is transferred to the elastic layer (1) so that an image of the elastic layer (1) and/or the surrounding environment is captured by the image sensor (7) and is processed in the control unit, whereby an object that contacts to the elastic layer (1) may be detected. Thus, tactile sensation is provided by detecting a force applied on the elastic layer (1) in an easy and practical manner, and also the outer environment can be scanned.

The invention claimed is:

1. A sensing system (S), characterized by comprising:
   at least an elastic layer (1);
   at least one image source (5) positioned under the said elastic layer (1) and adapted to generate at least one image (P) having a certain pattern and adapted to reflect the image generated onto the elastic layer (1), wherein said image source (5) is in the form of an liquid crystal display or in the form of a panel, each pixel of which including a red-green-blue light-emitting diode;
   at least one image sensor (7) positioned under the elastic layer (1), and adapted to capture an image coming from the elastic layer (1) or surrounding environment;
   at least one control unit adapted to control the image (P) generated by the said image source (5) and adapted to analyze the image captured by the image sensor (7) using image processing techniques so as to detect at least one data about the surrounding environment and/or to detect a force applied on the elastic layer (1);
   at least a first data link (8) for data communication between the image source (5) and the control unit; and
   at least a second data link (9) for data communication between the image sensor (7) and the control unit.

2. A sensing system (S) according to claim 1, characterized in that said elastic layer (1) comprises at least one upper surface (2) facing to the surrounding environment and at least one lower surface (3) facing to the image source (5) and the image sensor (7).

3. A sensing system (S) according to claim 2, characterized in that the said upper surface (2) is light-proof.

4. A sensing system (S) according to claim 3, characterized in that the said upper surface (2) is not absorbing light.

5. A sensing system (S) according to claim 2, characterized in that the said upper surface (2) is transparent.

6. A sensing system (S) according to claim 1, characterized by comprising at least one light source (4) located at the side of the image source (5) which is not facing to the elastic element (1).

7. A sensing system (S) according to claim 1, characterized in that the said image sensor (7) comprises special sensors for detecting certain physical and/or chemical features.

8. A sensing system (S) according to claim 7, characterized in that the said special sensor is a thermal camera sensor.

9. A sensing system (S) according to claim 1, characterized by comprising at least a fiber optic cable or cable bundle, a tips of which is paired with at least one pixel of the image sensor (7) and other tips of which comprises at least one fiber optic cable extending from the said elastic layer (1) to surrounding environment, which cable or cable bundle transmitting the image received from the surrounding environment to the image sensor (7).

10. A sensing system (S) according to claim 9, characterized in that the fiber optic bundle comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section.

11. A sensing system (S) according to claim 10, characterized in that the fiber optic bundle comprises at least two optic elements, each interposed between the carrier fiber optic
   cable and the first section, and between the carrier fiber optic cable and the second section.

12. A sensing system (S) according to claim 1, characterized by comprising at least one sound sensor.

13. A robotic hand (6) comprising a sensing system (S) according to claim 1.

14. A robotic hand (6) according to claim 13, characterized by comprising at least a source capable of generating vapor or another dense medium.

* * * * *